C. H. LOEW, G. R. LAWRENCE & H. BRUNNER.
BOTTLE WASHING APPARATUS.
APPLICATION FILED JUNE 17, 1907.

950,934.

Patented Mar. 1, 1910.
4 SHEETS—SHEET 1.

C. H. LOEW, G. R. LAWRENCE & H. BRUNNER.
BOTTLE WASHING APPARATUS.
APPLICATION FILED JUNE 17, 1907.

950,934.

Patented Mar. 1, 1910.
4 SHEETS—SHEET 2.

WITNESSES:

INVENTORS

C. H. LOEW, G. R. LAWRENCE & H. BRUNNER.
BOTTLE WASHING APPARATUS.
APPLICATION FILED JUNE 17, 1907.

950,934.

Patented Mar. 1, 1910.
4 SHEETS—SHEET 3.

WITNESSES:
INVENTORS,
Chas. H. Loew,
Geo. R. Lawrence, and
Hans Brunner
BY Bates, Fouts & Hull
ATTYS.

C. H. LOEW, G. R. LAWRENCE & H. BRUNNER.
BOTTLE WASHING APPARATUS.
APPLICATION FILED JUNE 17, 1907.

950,934.

Patented Mar. 1, 1910.
4 SHEETS—SHEET 4.

UNITED STATES PATENT OFFICE.

CHARLES H. LOEW, GEORGE R. LAWRENCE, AND HANS BRUNNER, OF CLEVELAND, OHIO, ASSIGNORS TO THE LOEW MANUFACTURING CO., OF CLEVELAND, OHIO, A CORPORATION OF OHIO.

BOTTLE-WASHING APPARATUS.

950,934.

Specification of Letters Patent.  Patented Mar. 1, 1910.

Application filed June 17, 1907. Serial No. 379,457.

*To all whom it may concern:*

Be it known that we, CHARLES H. LOEW, GEORGE R. LAWRENCE, and HANS BRUNNER, residing at Cleveland, in the county of Cuyahoga and State of Ohio, have invented a certain new and useful Improvement in Bottle-Washing Apparatus, of which the following is a full, clear, and exact description, reference being had to the accompanying drawings.

This invention relates to an apparatus for cleaning bottles, and has for its object to provide an apparatus of this character which shall positively and effectively clean the bottles inserted thereinto; which shall accommodate bottles of various sizes, whether standard or otherwise; which shall be constructed to permit of the convenient insertion into the apparatus of the bottles to be cleaned and the easy removal of the bottles therefrom after cleaning; which shall be provided with means for automatically supplying water to the interior of the bottles, particularly during the operation of the brushes; which shall be provided with means for permitting the water thus admitted to the apparatus to be drained without interfering with the operation of the brushes, and which, while comparatively simple, shall be effective and rapid in operation.

Generally speaking, the invention may be defined as consisting of the combinations of elements embodied in the claims hereto annexed.

Figure 1:
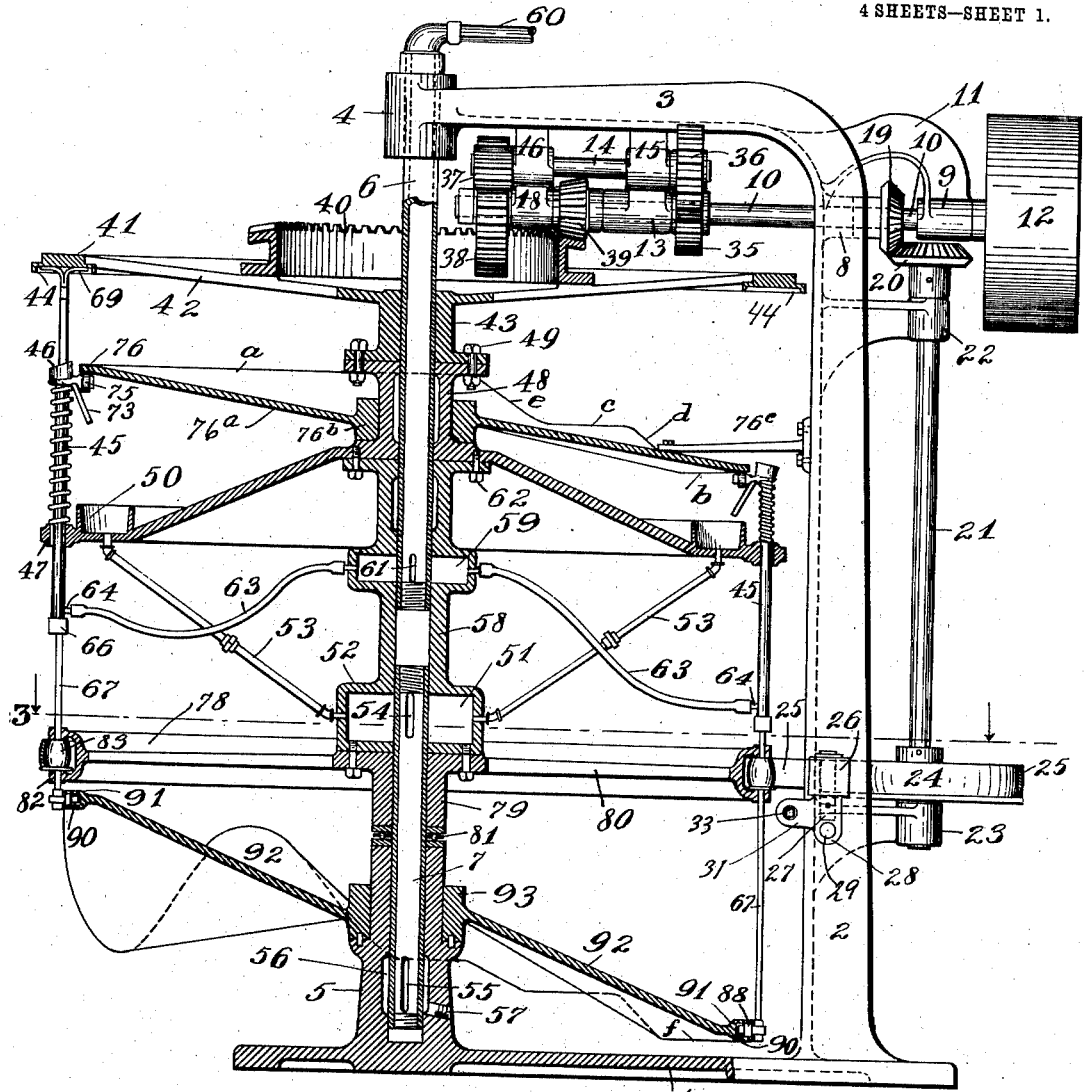
Figure 2:
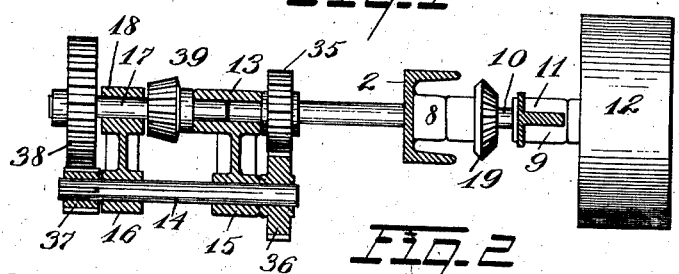
Figure 3:
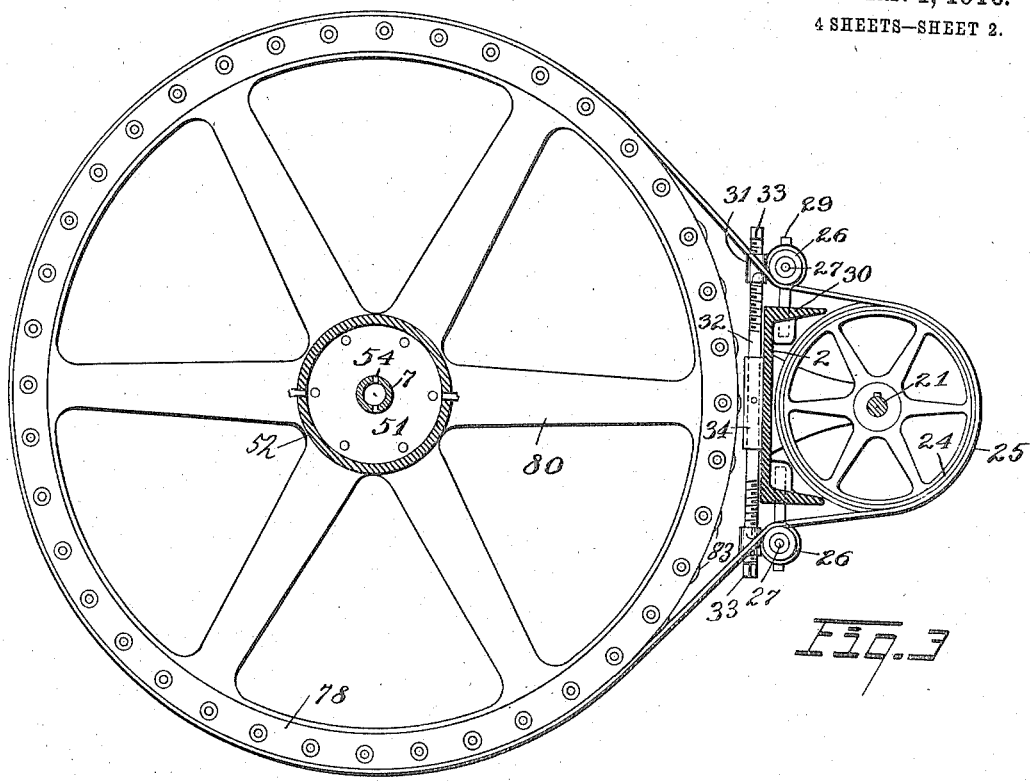
Figure 4:
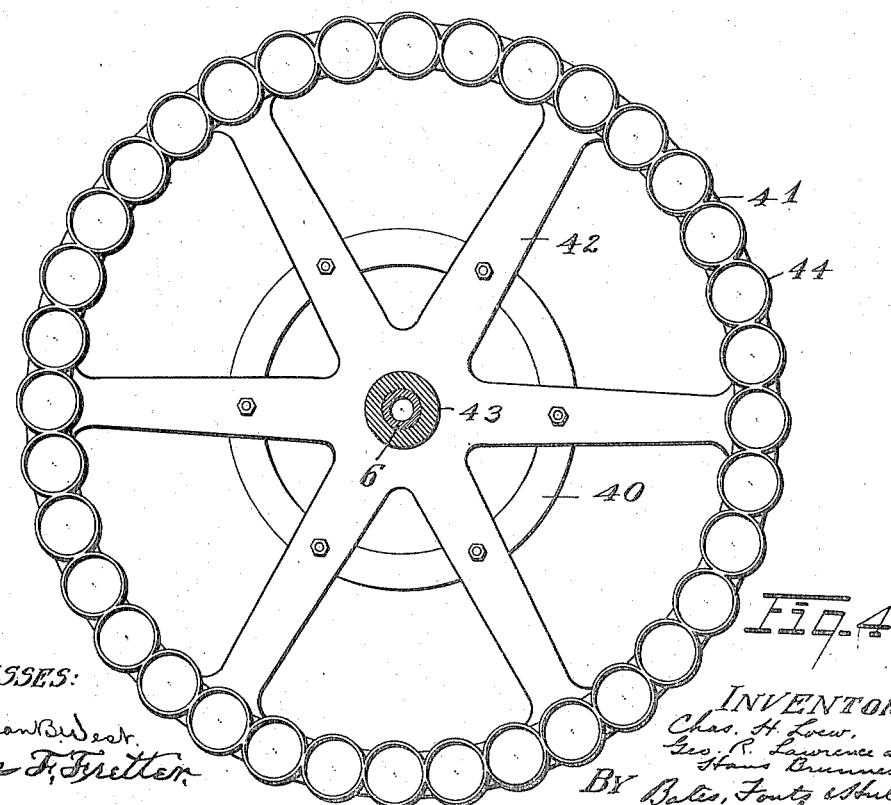
Figure 5:
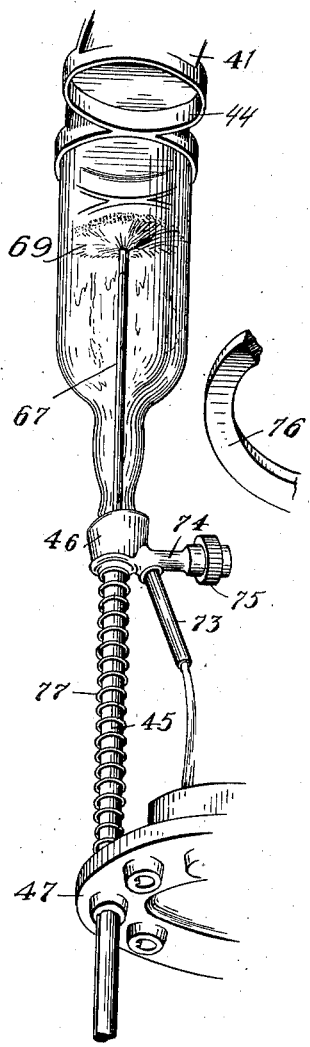
Figure 6:
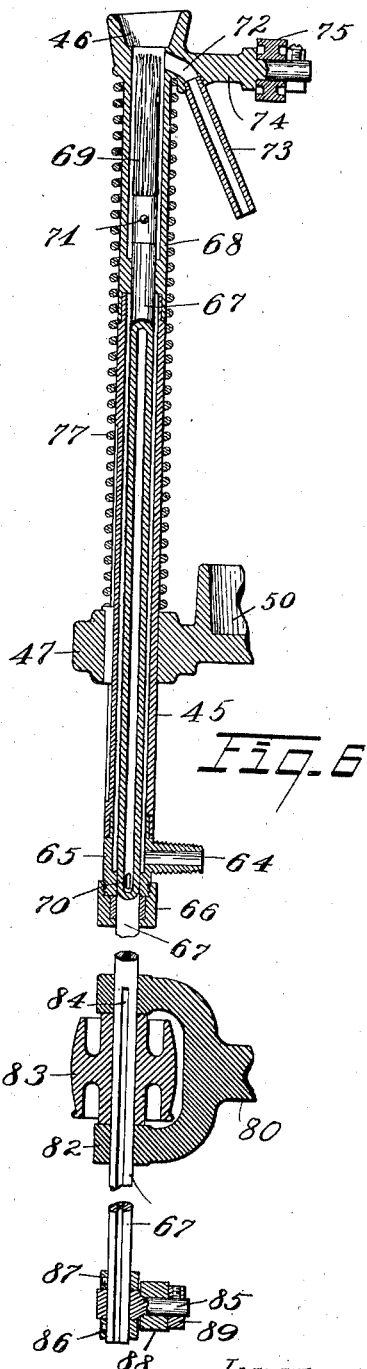
Figure 7:
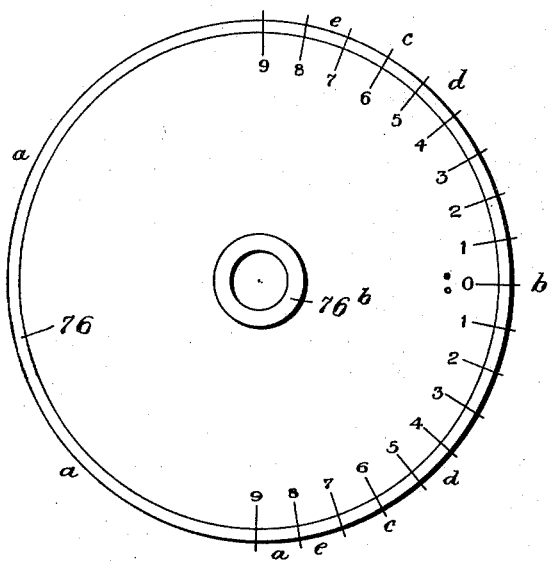
Figure 9:
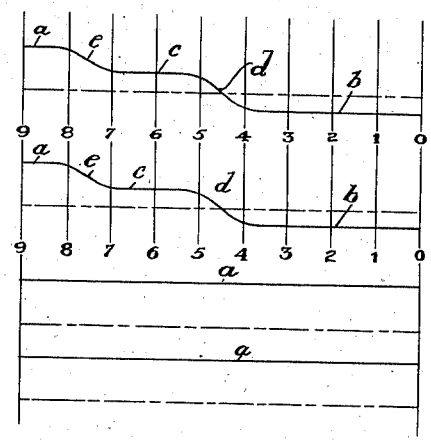
Figure 8:
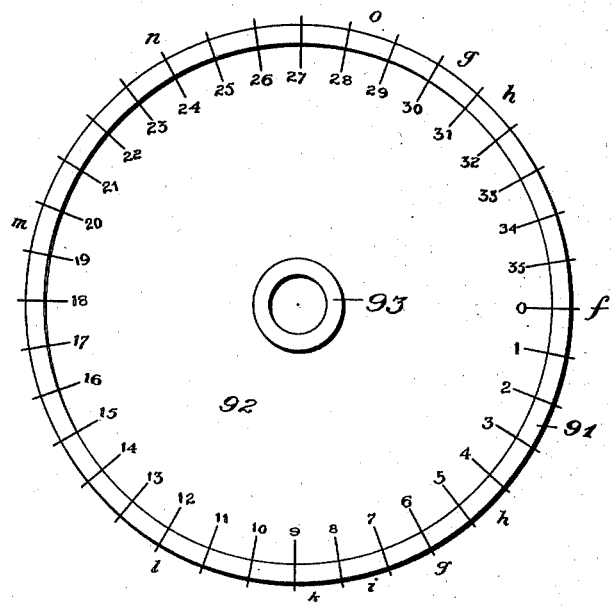
Figure 10:
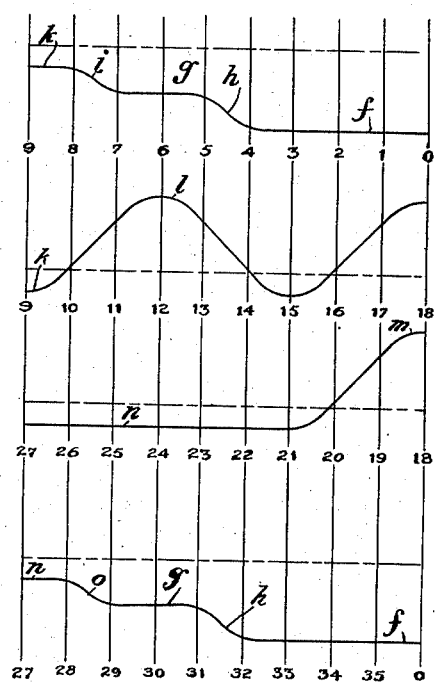

Referring to the drawings, Figure 1 represents a vertical sectional view through an apparatus constructed in accordance with our invention, the supporting frame and driving mechanism being shown mainly in elevation. Fig. 2 represents a detail, partly in section and partly in elevation, of the gears and shafting for rotating the apparatus. Fig. 3 represents a sectional view on the correspondingly-numbered line of Fig. 1. Fig. 4 represents a bottom plan view of the ring which supports the bases of the bottles. Fig. 5 represents a perspective detail illustrating the manner in which bottles are simultaneously scrubbed, supplied with water, and drained. Fig. 6 represents a longitudinal sectional detail of one of the brushes and the connections whereby water is supplied to and removed from the bottles. Fig. 7 represents a diagrammatic plan view of the cam which operates the sleeves through which the brush spindles reciprocate and water is supplied to the bottles. Fig. 8 represents a corresponding view of the cam which reciprocates the brushes and Figs. 9 and 10 represent developments of the cams shown in Figs. 7 and 8 respectively.

The complete apparatus comprises generally a supporting and centering frame and the bottle cleaning apparatus proper which is supported by said frame.

*Fixed frame.*—The frame is made preferably as a casting, and comprises a base 1 having at one end thereof a standard 2, the upper end of said standard being provided with an integral arm 3 projecting at substantially right angles therefrom and having its inner end provided with a sleeve 4 in alinement with an upwardly projecting sleeve 5 carried by the base. Sleeves 4 and 5 are provided respectively with metallic tubular extensions 6 and 7, which constitute bearings whereon the bottle cleaning apparatus proper may rotate. The inner or adjacent ends of the tubes 6 and 7 are preferably spaced and are closed by plugs threaded thereinto. The upper portion of standard 2 is provided with one of a pair of bearings 8 and 9 for the drive shaft 10, the bearing 9 being provided at the lower end of a bracket 11 projecting from the upper portion of standard 2. Shaft 10 is provided at its outer end with a pulley 12 whereby the same may be driven from any suitable source of power.

The inner end of the shaft 10 is supported by a bearing 13 projecting from and carried by the arm 3. 14 denotes a counter shaft also supported by bearings 15 and 16 carried by said arm 3. The bearing 15 may be formed with bearing 13 as an integral casting with the same and with the arm 3. 17 denotes a second counter shaft one end of which may be conveniently supported at one end by a bearing 13 and at the other end by a bearing 18 which is also carried by arm 3 and conveniently formed with bearing 16.

Shaft 10 is provided, a short distance from the outer end thereof, with a bevel gear 19 meshing with bevel gear 20 on a vertical shaft 21 carried by bearings 22 and 23 projecting from standard 2. The shaft 21 is provided, preferably near its lower end, with a pulley 24 for the reception of a belt 25 by means of which the brushes are rotated. The standard 2 also carries a pair of belt tighteners each consisting of a roller 26 carried by a vertical pin 27 fitting into a sleeve 28, the lower end of said sleeve being slidably fitted onto a horizontal stud 29 projecting from one of the side flanges 30 of the standard 2. The sleeve 28 is provided with an extension 31 having an internal thread for the reception of the end of bolt 32. The ends of this bolt are oppositely threaded and said ends are provided each with a squared extension 33 to permit the application of a wrench thereto. By rotating bolt 32 in its sleeve 34, the belt tighteners will be moved simultaneously inwardly or outwardly, according to the direction of rotation imparted to the belt. The sleeve 34 is conveniently formed integrally with standard 2.

The inner end of shaft 10 is provided with a spur gear 35 meshing with a corresponding gear 36 on counter shaft 14. The opposite end of the counter shaft is provided with a reduction gear 37 meshing with a considerably larger gear 38 on counter shaft 17. This shaft is also provided with a bevel gear 39 adapted to mesh with the corresponding bevel rack 40 on top of the cleaning apparatus proper, which will now be described.

*Bottle cleaning apparatus.*—The bottle-cleaning apparatus comprises generally a rotary frame comprising a bottle support, a rotating carrier, which assists in supporting the bottles, a series of rotary and reciprocable brushes adapted to enter the interior of the bottles on the carrier, means for rotating and reciprocating said brushes, and mechanism for supplying water to the interior of the bottles during the operation of the brushes and for removing the water from said bottles. The bottle carrier, the means for supplying water to the interior of the bottles, the brushes, the means for rotating said brushes, and the means for collecting and disposing of the waste water from the bottles are all rotatably mounted on the tubular bearings 6 and 7 projecting from the sleeves 4 and 5.

The bottle-carrier comprises a ring 41 connected by spokes 42 to a central hub 43 which is rotatably mounted on the bearing 6. This ring constitutes a support for the bottoms of the bottles and is provided on its under side with a suitable number of circular flanges 44 each constituting a seat for the bottom of a bottle. Below the ring 41 and in vertical alinement with the central portions of said seats, there is provided a corresponding number of sleeves 45, each having at its upper end a cup-shaped mouth 46 for the reception of the mouth of a bottle. The upper ends of these cups taper downwardly from the inner edge to the outer edge thereof, to facilitate the insertion of the mouths of the bottles thereinto. The sleeves 45 are reciprocably mounted in a ring or carrier 47 having apertures therethrough for said sleeves and provided with a central hub 48 which may be connected to hub 43, as by bolts 49 extending through the adjacent flanged ends of said hubs. The ring 47 is preferably in a lower plane than the bottom of its hub to provide space for the cam by means of which the sleeves 45 are automatically operated to permit the insertion of bottles into the carrier and the subsequent removal of bottles therefrom. Within the periphery of the ring 47 there is formed, preferably integral therewith, a trough 50 into which the wash water discharged from the bottles is received and from which it is discharged into a chamber 51 provided in a hollow hub 52 mounted on bearing 7, the chamber 51 being connected with the trough by means of pipes 53. From chamber 51, the wash water may be discharged into the hollow bearing 7 through a suitable number of elongated slots 54 and thence through a suitable number of elongated slots 55 into chamber 56 in sleeve 5, whence it may be conducted through outlet 57 to any desired point. The closed upper end of sleeve 7 cuts off communication between chamber 51 and the bore of hub 58. This hub is provided also with a chamber 59 into which water for washing the bottles is supplied through pipes 6 and the flexible connection 60. Communication is established between pipe 6 and chamber 59 by a suitable number of ports 61. The upper end of hub 58 is secured to the lower end of hub 48 by bolts 62. By means of flexible pipes 63, water is supplied from the distributing chamber 59 to the sleeves 45, whence it flows to the bottles mounted in the carrier in the manner to be described hereinafter.

Each of the sleeves 45 is provided at the lower end with an inlet connection 64 to which a flexible tube 63 is connected. This connection is preferably formed as part of a closure 65 for the lower end of said sleeve 45, the closure being provided with a bottom registering and communicating with the bore of the sleeve 45. A stuffing box 66 is threaded onto the lower end of the closure 65 and through this stuffing box extends the hollow spindle 67 for the brush, by means of which the interior of the bottles are cleaned. The upper end of sleeve 45 is continued and closed by a second sleeve 68, the lower end whereof is provided with an aperture for the spindle 67 and closely fitting said spindle. The upper end of the spindle is provided with the brush 69 suitably secured thereto. The spindle is provided with a bore extending longitudinally from substantially the top to a point intermediate between the top and bottom thereof, and the spindle is provided with a suitable number of apertures 70 just above the lower end of the bore thereof and communicating with said bore, the apertures being so located that, when the top of the brush 69 is slightly below the bottom of the cup 46, said apertures are slightly below the bottom of the chamber provided in the closure 65. When the brush spindle is elevated, by means to be hereinafter described, the water supplied into the bore of sleeve 45 will enter the bore of the brush spindle through apertures 70 and will be discharged through the upper end of said spindle and through the center of the brush, which is secured to the spindle by pin 71.

Each cup 46 is provided with a port 72 leading from the bottom thereof into which is fitted a discharge pipe 73 through which the waste water from the bottles may be discharged into the trough 50. Each cup is also provided with a stud 74, preferably integral therewith and provided with a roller 75 which is adapted to engage the lower surface of the cam 76. A spiral spring 77 surrounds each sleeve 45 with the lower end of the spring in engagement with ring 47 and the upper end in engagement with the bottom of the cup 46. By means of this spring, the rollers 75 are maintained in engagement with the lower surface of cam 66.

78 denotes a bearing ring which is provided with a hub 79 and with spokes 80, said hub being preferably bolted to the bottom of chamber 51. Between the bottom of this hub and the top of sleeve 45 there is interposed a ball bearing 81. The outer edge of the ring 78 is substantially U-shaped in section and is provided with alined bearings 82 for the spindles 67. The U-shaped recess provided in the periphery of the ring receives the pulleys 83, which are slidably keyed to the spindles 67, each of said spindles being provided with an elongated key way 84 by means of which they are keyed to the pulleys 83 throughout their vertical range of movement. The belt 25 extends around the ring 78 and, by means of the belt tighteners, is in engagement with more than half of the pulleys 83. With the parts arranged as shown in the drawings, said belt is in engagement with about three-fourths of said pulleys, whereby, during the rotation of the apparatus by means of the bevel gear 39 and rack 40, a corresponding number of brush spindles is being rotated. Each spindle is provided, at or adjacent to its lower end, with a stud 85 sleeved thereon and retained in place by means of rings 86 and 87 (see Fig. 6). This stud is provided with a roller 88 retained by a lock nut 89, said roller fitting into a U-shaped track 90 provided in the outer edge of a cam ring 91. This cam ring is provided with a web 92 connecting the same with a central hub 93, which is rigid with sleeve 5.

Cam ring 76 is provided with a web 76ª connecting the same with the hub 76ᵇ, which is sleeved onto the hub 48. The cam ring 76 is prevented from rotating by means of one or more arms 76ᶜ projecting inwardly from the standard 2 and connected to the web, as indicated more particularly in Fig. 1. The upper cam ring 76, as will appear more particularly from Figs. 1, 7 and 9, is constructed as follows: The highest portion of the cam occupies about three-fourths of the circumference of the ring 76 and is parallel with the ring 41. The distance between this portion of the cam ring and the corresponding portion of the ring 41 will be somewhat less than the length of the shortest bottles which will be inserted into our apparatus. This portion of the cam is marked $a$ on Figs. 1, 7 and 9 of the drawing. For convenience of representation, the cam ring is divided into thirty-six equal parts, corresponding to the number of bottle seats which are provided in ring 41, and the subdivisions represented on Figs. 7 to 10 inclusive correspond in number to the number of bottles which may be inserted into the apparatus. Of course, with a larger or smaller apparatus, the number of subdivisions will be correspondingly varied. The lowest portion of the cam extends about one-fourth of the circumference of the ring 76 and is parallel with the ring 41. The distance between this portion of the cam and the ring 41 will be somewhat greater than the length of the longest bottles which will ordinarily be inserted into our apparatus. This portion of the cam is marked $b$ on Figs. 1 and 9 of the drawings, and, as will appear hereinafter, corresponds to the inactive period of the apparatus in the operation of cleaning and washing the bottles. Intermediate between the portions $a$ and $b$, the cam ring is provided, on opposing sides thereof, with a portion $c$, which is also parallel with the ring 41, the distance between said ring and the portion $c$ being somewhat less than the length of standard bottles intermediate in size between the longest and shortest bottles which will be inserted into the apparatus. For the purpose of accommodating bottles of lengths other than standard, we have provided two opposite sets of inclines $d$ and $e$, connecting respectively portions $b$ and $c$ and $a$ and $c$.

For the purpose of reciprocating the brushes, the cam ring 91 is employed. The shape of this cam is represented diagrammatically in Figs. 8 and 10 of the drawings. In these figures, the circumference of the cam ring is divided into 36 equal parts, corresponding to the number of bottles to be inserted into the apparatus. The lower portion of this cam extends about one-eighth of the circumference thereof on each side of the zero mark. This portion is designated $f$ on Figs. 8 and 10 and corresponds to $b$ on Figs. 7 and 9. When a spindle roller is in engagement with this portion of the cam ring, the roller of its cup 46 will be below the lower portion $b$ of the cam ring 76 and the top of the brush will be below the bottom of said cup, in about the position represented in Fig. 6. For a comparatively short distance (about one-twelfth of the circumference) on each side of portion $f$, the cam ring is provided with a portion $g$ which is parallel with portion $c$ on cam ring 76 and substantially coextensive therewith. This portion $g$ is connected with portion $f$ by means of an incline $h$ corresponding in position to incline $d$ on cam ring 76. An inclined surface, $i$ corresponding to incline $e$ of cam ring 76, connects portion $g$ with portion $k$. Portion $k$ is, however, of short extent and, in a distance of about one-third of the circumference, the upper surface of cam ring 91 is so shaped as to cause two reciprocations of the brush spindles. The portions of the cam by which the brush spindles are so reciprocated are represented at $l$ and $m$ in Fig. 10. After causing the second complete reciprocation, the upper surface of cam ring 91 is substantially straight and parallel with the portion $a$ of cam ring 76, being in the same plane as the portion $k$. This straight portion of the cam ring is represented at $n$ and occupies about one-sixth of the circumference of the ring and is connected with the adjacent portion $g$ by means of incline $o$, corresponding to portion $i$.

With the parts as above described the operation will be as follows: An operator stands on each side of the machine, near the standard 2. One of the operators inserts into the slowly rotating apparatus the bottles which are to be washed, pressing downwardly upon the cups 46 to permit the insertion of the mouths thereinto and inserting the bases of the bottles in the cup flanges 44. As the apparatus rotates, the arrangement of the gearing is such that the belt 25 drives the pulleys 83 in a direction the reverse of that given to the apparatus by gear 39 and rack 40. This imparts very rapid rotation to the brush spindles. By the operation of belt 25 on pulleys 83, the brushes are rotated and by action of cam ring 91 are reciprocated within the bottles. As the brush spindles move upwardly into the bottles, water is admitted from sleeve 45 through ports 70 into the interior of the spindles and thence into the bottles. The size of the spindles is sufficiently smaller than the necks of the bottles to permit the water discharged thereinto to escape freely through cups 46 and outlet connections 73 into troughs 50. The height of cam elevations $l$ and $m$ is sufficient to move the brushes twice to the bottoms of the bottles for each revolution of the apparatus and the depth of such cams is sufficient to enable the brushes to reach the necks of the longest bottles which will ordinarily be inserted into the apparatus, insuring the cleaning of the entire inner surfaces of the bottles by the brushes, irrespective of the lengths of the bottles. When the roller of a brush spindle has reached the lower end of cam surface $m$, its reciprocation is ended, and, while the spindle is traveling along the portion $n$ of such cam, ample time is provided for draining the bottle. The portion $n$ of the cam will also withdraw the brush and spindle entirely from the necks of the shortest bottles, and portions $g$ and $f$ will withdraw the brushes from the necks of the correspondingly longer bottles, portion $f$ insuring the removal of the brush from the neck of the longest bottle for which the apparatus is designed. As the carrier ring brings the washed bottles to his station, the operator on that side of the machine removes them from their seats between the ring 41 and cups 46. With the attendance of two men, one to insert bottles into and the other to remove the washed bottles from the apparatus, the apparatus may be operated continuously. Owing to the fact that the water is admitted simultaneously with the scrubbing operation and to the rapid rotation of the brushes and the reciprocating of the same during such rotation, the bottles are thoroughly cleansed during their excursion in the apparatus.

From an inspection of Figs. 1, 3 and 10, it will be apparent that the belt 25 is out of engagement with the pulleys of the spindles which may be above the portion $f$ of the cam ring 91. From this, it follows that when the brush spindles are withdrawn to their lowest position (or position at which the water supply to the bottles is cut off) the rotation of the spindles by the belt ceases.

The apparatus above described, while extremely efficient in operation, is comparatively simple and inexpensive of production and is automatic in operation as to the scrubbing, water-supplying, and draining features, and is, moreover, capable of a wide range of application, accommodating bottles of various standard lengths as well as bottles which vary from such standard lengths.

We claim:—

1. In a bottle cleaning apparatus, the combination of a rotary member having means for supporting the bottoms of a plurality of bottles, a plurality of sleeves each having at its end a seat for the mouth of the bottle, a hollow brush spindle in each sleeve, a rotary support for said sleeves, means for supplying water to said sleeves, means for supplying water from the sleeves to the interior of the spindles and thence to the interior of the bottles, said last mentioned means being operative by the rotating of said rotary member and said support for the sleeves, and means for draining said bottles.

2. In an apparatus for cleaning bottles, the combination of a rotary member adapted to support the bottoms of a plurality of bottles, a rotary support a plurality of sleeves carried thereby, each sleeve having a seat for the mouth of a bottle, a brush spindle extending through each of said sleeves and having a brush thereon, means for rotating the individual spindles, means for reciprocating the spindles, and means controlled by the reciprocating movement of each spindle for supplying water to the interior of a bottle, substantially as specified.

3. In an apparatus for cleaning bottles, the combination of a frame, means for rotating the same, said frame having a member adapted to support the bottoms of bottles, a plurality of sleeves each having a seat for the mouth of a bottle, said sleeves being supported in the frame and rotating therewith a brush spindle extending through each of said sleeves and having a brush on the end of the same, means for rotating said spindles, means operative by the rotation of the frame for automatically reciprocating the spindles, and means controlled by the reciprocating movement of each spindle for supplying water through its sleeve to the interior of the bottle seated thereon, substantially as specified.

4. In a bottle cleaning apparatus, the combination of a bottle support having means for supporting therein a plurality of bottles, a carrier, a plurality of brushes reciprocably supported by said carrier, each of said brushes having a spindle, means for rotating said bottle support and carrier, means for supplying water to the interior of the bottles in said support, a cam operatively engaging the brush spindles and arranged to reciprocate the same during the rotation of said support and carrier, and means whereby the reciprocation of the brush spindles controls the supply of water to the bottles, substantially as specified.

5. In a bottle-cleaning apparatus, the combination of a bottle support, a carrier, a plurality of brushes reciprocably mounted in said carrier and each having a spindle, a pulley on each spindle, a common supporting ring for all of said pulleys, means for rotating the bottle support, carrier and ring, a belt engaging the pulleys on said spindles, and a cam operatively engaging said spindles and adapted to reciprocate the same during the rotation of the carrier, substantially as specified.

6. In a bottle-cleaning apparatus, the combination of a bottle support, a carrier, a plurality of brushes reciprocably mounted in said carrier and each having a spindle, a pulley on each spindle, means for rotating the bottle support and carrier, and a common belt for the pulleys on said spindles, substantially as specified.

7. In an apparatus for cleaning bottles, the combination of a bottle support, a carrier, a plurality of brushes reciprocably mounted in said carrier and each having a spindle, a journal ring, a pulley on each spindle journaled in said ring, a belt extending around said ring and adapted to engage said pulleys, and means for rotating said support, carrier and ring, substantially as specified.

8. In an apparatus for cleaning bottles, the combination of a bottle support, a carrier, a plurality of brushes reciprocably mounted in said carrier and each having a spindle, a pulley on each spindle, a belt extending around all of said spindles and adapted to engage said pulleys, and means for operating said belt, substantially as specified.

9. In a bottle-cleaning apparatus, the combination of a support for bottles, a plurality of brush spindles, a pulley on each spindle, a ring in which said pulleys are journaled, a belt extending around said ring, means for rotating said support and ring, and means for driving the belt in the reverse direction from said support and ring, substantially as specified.

10. In a bottle-cleaning apparatus, the combination of a support for bottles, a plurality of brush spindles, a pulley on each spindle, a belt common to all of said pulleys, means for rotating said bottle support, and connections for driving said belt from such rotating means, substantially as specified.

11. In a bottle-cleaning apparatus, the combination of a supporting ring for the bottoms of the bottles, a circular series of sleeves each having a seat for the mouth of a bottle, a hollow brush spindle in each of said sleeves and carrying a brush, means for supplying liquid to the said sleeves, there being ports establishing communication between said sleeves and the hollow spindles, and means for reciprocating said spindles, the parts being arranged to close the ports when the brushes are below the tops of said sleeves, substantially as specified.

12. In a bottle-washing apparatus, the combination of a plurality of seats for the bottoms of bottles, a plurality of supports for the mouths of the bottles located below the seats, each of said supports comprising a sleeve having a connection for supplying liquid thereto, a brush spindle mounted in each of said sleeves, said spindle being provided with a bore extending downwardly from the upper end thereof and being provided with a port communicating with said bore and adapted to communicate with said sleeve, and means for reciprocating said spindles, the arrangement of the parts being such that, when a brush is carried above its sleeve, communication is established between the bore of the spindle and the sleeve, substantially as specified.

13. In a bottle-washing apparatus, the combination of a plurality of seats for the bottoms of bottles, a plurality of supports for the mouths of the bottles and located below the seats, each of the said supports comprising a sleeve having a connection for supplying liquid thereto, a brush spindle mounted in each of said sleeves, said spindle being provided with a bore extending downwardly from the upper end thereof and being provided with a port communicating with said bore and adapted to communicate with said sleeve, means for rotating said seats and supports, and means for reciprocating said spindles by the rotation of said seats and supports, the arrangement of ports being such that, when a brush is carried above its sleeve, communication is established between the bore of the spindle and the sleeve, substantially as specified.

14. In a bottle-cleaning apparatus, the combination of a ring adapted to support the bottoms of bottles, a circular series of reciprocable supports for the mouths of bottles, a brush spindle reciprocably mounted in each of said reciprocable supports, a cam operatively engaging said supports, a cam operatively connected with said brush spindles, and means for rotating said ring and supports, substantially as specified.

15. In a bottle-cleaning apparatus, the combination of a ring adapted to support the bottoms of bottles, a plurality of reciprocable sleeves below said ring and each having a seat for the mouth of a bottle, means for supplying liquid to said sleeves, a brush spindle mounted in each of said sleeves, a cam operatively engaging said sleeves, said cam being circular in outline and having portions thereof at different distances from said ring, a second cam operatively connected with said spindles, said cam also being circular in outline and having portions thereof at different distances from said ring, and means for rotating said ring and said mouth supports, substantially as specified.

16. In a bottle-cleaning apparatus, the combination of a ring adapted to support the bottoms of bottles, a plurality of reciprocable sleeves below said ring and each having a seat for the mouth of a bottle, means for supplying liquid to said sleeves, a brush spindle mounted in each of said sleeves, a cam operatively engaging said sleeves, said cam being circular in outline and having portions thereof at different distances from said ring, a second cam operatively connected with said spindles, said cam also being circular in outline and having portions thereof at different distances from said ring, means for rotating said ring and said mouth supports, and means controlled by the reciprocation of the brush spindles for supplying liquid from the sleeves to the bottles, substantially as specified.

17. In a bottle-cleaning apparatus, the combination of a ring adapted to support the bottoms of bottles, a plurality of sleeves below said ring and each having a seat for the mouth of a bottle, a liquid supply leading to said apparatus, flexible connections extending between said supply and said sleeves, a drain pipe from each of said seats, a trough located below said drain pipes, a waste water receptacle, connections between said trough and receptacle, brush-spindles mounted in said sleeves, means for rotating said ring and supports, and a cam adapted and arranged to reciprocate the brush spindles during the rotation of the aforesaid parts, substantially as specified.

18. In a bottle cleaning apparatus, the combination of a circular series of sleeves, each having at its upper end a cup for the reception of the mouth of a bottle, a circular series of supports for the bottoms of bottles arranged above the said cups, a ring through which said sleeves extend and located below the cups thereon, a trough carried by said ring, drain pipes leading from said cups and adapted to discharge into said trough, means whereby said ring and the circular series of bottom supports may be rotated simultaneously, and means for supplying water through said sleeves to the bottles supported by said cups, substantially as specified.

19. In a bottle cleaning apparatus, the combination of a ring having thereon a plurality of downwardly directed seats for the bottoms of bottles, a circular series of sleeves arranged below said ring and each provided with a seat for the mouth of a bottle, a ring below the seats for the bottle mouths and through which said sleeves extend, a circular trough on said ring, a drain pipe extending from each sleeve above said trough and arranged to discharge thereinto, means for rotating said rings simultaneously, and means for supplying water through said sleeves to the interior of the bottles supported thereon, substantially as specified.

20. In a bottle cleaning apparatus, the combination of a circular series of seats for the bottoms of bottles, a ring beneath said seats, a circular series of sleeves extending through and guided by said ring, each sleeve having at its upper end a seat for the mouth of a bottle, a circular cam adapted to operatively engage said sleeves and having several portions thereof in different horizontal planes, said portions being connected by a plurality of inclines, means for holding the sleeves in engagement with the cam and means for supplying water through said sleeves to the interior of the bottles supported thereon, substantially as specified.

21. In a bottle cleaning apparatus, the combination of a circular series of downwardly directed seats for the bottoms of bottles, a ring below said seats, a circular series of sleeves extending through and guided by said ring, each of said sleeves having at its upper end a seat for the mouth of a bottle, a circular cam adapted to engage said sleeves, springs tending to hold said sleeves in engagement with said cam, said cam having several portions of its surface at different distances from the seats for the bottle bottoms with inclines connecting such portions, means for supplying water to said sleeves, a brush spindle mounted in each sleeve, a circular cam adapted to engage said brush spindles and reciprocate the same, and means for rotating simultaneously the series of supports for the bottle bottoms and the ring through which the sleeves extend, substantially as specified.

22. In a bottle cleaning apparatus, the combination of a circular series of seats for the bottoms of bottles, a circular series of sleeves below said seats each having at its upper end a seat for the mouth of a bottle, means for supplying water to said sleeves, a brush spindle reciprocably mounted in each sleeve, a pulley mounted on each spindle for rotating the same and movable longitudinally thereon, a supporting ring common to all of said pulleys, a circular cam arranged to engage said spindles to reciprocate the same, a belt extending around the pulley-supporting ring and arranged to engage simultaneously a plurality of the pulleys supported thereby, a ring through which the sleeves extend, means yieldingly supporting said sleeves from said ring and means for simultaneously rotating the said rings and the supports for the bottoms of the bottles, substantially as specified.

23. In a bottle cleaning apparatus, the combination of a circular series of supports for the bottoms of bottles, a circular series of sleeves each having at its upper end a seat for the mouth of a bottle, a rotary support through which said sleeves extend, a brush spindle reciprocably mounted in each of said sleeves, a pulley on each spindle and movable longitudinally with respect thereto, a ring supporting all of said pulleys, a belt-driving pulley of smaller diameter than the last-mentioned ring and mounted adjacent thereto, a belt extending around said last-mentioned ring and said belt pulley and engaging a plurality of the brush-spindle pulleys, a circular cam operatively engaging all of said spindles, said cam having portions thereof at different distances from said ring, the lowest portion being substantially co-extensive with the portion of the pulley-supporting ring which is disengaged by the belt, means for rotating the series of bottle bottom supports, means for driving the belt pulley, and connections whereby the rotation of the pulley-supporting ring rotates the sleeve support, substantially as specified.

24. In a bottle cleaning apparatus, the combination of a circular series of supports for the bottoms of bottles, a circular series of seats for the mouths of bottles, a brush spindle reciprocable with respect to each of said seats, a pulley on each spindle and movable longitudinally with respect thereto, a ring supporting all of said pulleys, a belt-driving pulley of smaller diameter than the last-mentioned ring and mounted adjacent thereto, a belt extending around said last-mentioned ring and said belt pulley and engaging a plurality of the brush-spindle pulleys, a circular cam operatively engaging all of said spindles, said cam having portions thereof at different distances from said ring, the lowest portion being substantially co-extensive with the portion of the pulley-supporting ring which is disengaged by the belt, means for rotating the series of bottle bottom supports, means for driving the belt pulley, and connections for simultaneously rotating the series of bottle-mouth seats, substantially as specified.

25. In a bottle-cleaning apparatus, the combination of a series of supports for the bottoms of bottles, a series of sleeves corresponding to said supports and between which and said supports bottles may be inserted, connections for supplying liquid to said sleeves, a reciprocable brush spindle mounted in each sleeve, means for rotating said spindles, means normally pushing the sleeves toward the bottle supports means for automatically moving the sleeves away from said supports to permit the insertion and removal of bottles, and means for automatically suspending the rotation of said spindles at such period of operation, substantially as specified.

26. In a bottle-cleaning apparatus, the combination of a ring having a plurality of downwardly directed bottle-bottom supports, a ring below the former ring, a circular series of sleeves mounted in the latter ring and each having at its upper end a seat for the mouth of a bottle, a brush spindle mounted in each sleeve, means for rotating the said rings and simultaneously rotating the spindles, means normally pushing the sleeves toward the bottle supports, means whereby the sleeves may be moved away from the first-mentioned ring to facilitate the insertion and removal of bottles during a portion of the period of rotation, and means whereby the rotation of the spindles will be automatically suspended during such period of rotation, substantially as specified.

27. In a bottle-cleaning apparatus, the combination of a ring having a plurality of downwardly directed seats for bottle bottoms, a ring mounted below the former ring, a circular series of sleeves mounted in the latter ring each having at its upper end a cup for the reception of the mouth of a bottle, means for supplying water through said sleeves, a circular cam interposed between said rings and adapted to engage the said sleeves, and a spring for each sleeve having the lower end thereof mounted on the second ring and the upper end engaging the cup thereon, substantially as specified.

28. In a bottle-cleaning apparatus, the combination of a support having a plurality of downwardly directed seats for the bottoms of bottles, a guiding member mounted below said supports, a plurality of sleeves extending through said member, each sleeve having a cup at the upper end thereof for the reception of the mouth of the bottle, a spring mounted on each sleeve and having the upper end engaging said cup and the lower end engaging said member, and a second member operatively engaging said sleeves and arranged to separate the same from the support, substantially as specified.

29. In a bottle cleaning apparatus, the combination of a rotary member having means for supporting the bottoms of a plurality of bottles, a plurality of sleeves each having at its end a seat for the mouth of the bottle, a rotary support for said sleeves, a hollow brush spindle in each sleeve, means for supplying water to the said sleeves and to the interior of the spindles and thence to the interior of the bottles, means for causing said spindles to reciprocate, and means whereby the reciprocation of the brush spindles control the supply of water to the interior of the spindles and to the bottles and means for draining said bottles.

In testimony whereof, we hereunto affix our signatures in the presence of two witnesses.

CHARLES H. LOEW.
GEO. R. LAWRENCE.
HANS BRUNNER.

Witnesses:
EMIL O. SAELTZER,
BERTHA H. BIERMANN.